United States Patent
Zhong et al.

(10) Patent No.: US 9,021,716 B2
(45) Date of Patent: May 5, 2015

(54) DEVICES FOR AIR-DRYING SLUDGE

(75) Inventors: Huansheng Zhong, Guangzhou (CN);
Xuewei Wu, Guangzhou (CN); Jiacong Wu, Guangzhou (CN); Zhimin Sun, Guangzhou (CN); Haiying Yang, Guangzhou (CN)

(73) Assignee: Guangzhou New Extend Rising Environmental Protection Technologies Machinery Equipment Co., Ltd., Guangdong Province (CN)

( * ) Notice: Subject to any disclaimer, the term of this patent is extended or adjusted under 35 U.S.C. 154(b) by 0 days.

(21) Appl. No.: 13/576,992

(22) PCT Filed: Mar. 8, 2010

(86) PCT No.: PCT/CN2010/000283
§ 371 (c)(1),
(2), (4) Date: Sep. 28, 2012

(87) PCT Pub. No.: WO2011/094904
PCT Pub. Date: Aug. 11, 2011

(65) Prior Publication Data
US 2013/0167394 A1    Jul. 4, 2013

(30) Foreign Application Priority Data

Feb. 5, 2010 (CN) ...................... 2010 2 0112966 U

(51) Int. Cl.
*F26B 21/08*    (2006.01)
*F26B 17/20*    (2006.01)
(Continued)

(52) U.S. Cl.
CPC .............. *F26B 21/086* (2013.01); *C02F 11/12* (2013.01); *F26B 17/205* (2013.01); *F26B 23/002* (2013.01); *F26B 2200/18* (2013.01)

(58) Field of Classification Search
CPC .... F26B 21/08; F26B 17/205; F26B 2200/18; F26B 21/086; F26B 25/006; F26B 23/002; F26B 23/004; F26B 23/005; F26B 23/008; C02F 11/12

USPC ......... 34/72, 73, 76, 77, 78, 79, 86, 179, 180, 34/181, 182, 183, 209, 210, 212, 215, 218, 34/219, 239; 62/92, 271
See application file for complete search history.

(56) References Cited

U.S. PATENT DOCUMENTS

| 4,330,946 A * | 5/1982 | Courneya ..................... 34/86 |
| 4,426,791 A * | 1/1984 | Coppa ........................... 34/77 |

(Continued)

FOREIGN PATENT DOCUMENTS

| CA | 2289444 A1 | 11/1998 |
| CN | 1942728 A | 4/2007 |

(Continued)

OTHER PUBLICATIONS

International Search Report for Application PCT/CN2010/000283 dated Nov. 18, 2010.

(Continued)

*Primary Examiner* — Kenneth Rinehart
*Assistant Examiner* — Tavia Sullens
(74) *Attorney, Agent, or Firm* — Honigman Miller Schwartz and Cohn LLP

(57) ABSTRACT

An air-drying device for sludge comprises at least one air-drying mechanism, a dosing mechanism, and a dehumidifying and heating mechanism. There two air-drying mechanisms. The dosing mechanism connects with the beginning end of the first air-drying mechanism (5) whose terminal end communicates with the beginning end of the second air-drying mechanism (8), with a discharge port (21) is arranged above the communicating position. The terminal end of the second air-drying mechanism communicates with the beginning end of the first air-drying mechanism to form a loop configuration. The device has high efficiency and low energy consumption. The detention time of the sludge in the drying device is adjustable so that the water content of the discharging material is adjustable.

6 Claims, 3 Drawing Sheets

(51) Int. Cl.
*C02F 11/12* (2006.01)
*F26B 23/00* (2006.01)

(56) References Cited

U.S. PATENT DOCUMENTS

| | | | | |
|---|---|---|---|---|
| 4,974,335 | A | * 12/1990 | Bege et al. | 34/86 |
| 5,220,733 | A | * 6/1993 | Bothe et al. | 34/180 |
| 5,245,762 | A | * 9/1993 | Hartis et al. | 34/402 |
| 5,318,184 | A | 6/1994 | Krebs | |
| 5,343,632 | A | * 9/1994 | Dinh | 34/86 |
| 5,680,711 | A | * 10/1997 | Moratalla | 34/77 |
| 5,966,838 | A | 10/1999 | Krebs et al. | |
| 6,094,835 | A | * 8/2000 | Cromer | 34/86 |
| 6,209,223 | B1 | * 4/2001 | Dinh | 34/86 |
| 6,471,898 | B1 | 10/2002 | Barre et al. | |
| 2007/0289205 | A1 | * 12/2007 | Sparks | 44/605 |
| 2008/0216346 | A1 | 9/2008 | Fernando et al. | |

FOREIGN PATENT DOCUMENTS

| | | |
|---|---|---|
| CN | 101224912 A | 7/2008 |
| CN | 101585653 A | 11/2009 |
| CN | 101618931 A | 1/2010 |
| CN | 201574114 U | 9/2010 |
| JP | 1028998 | 2/1998 |
| JP | 200493018 | 3/2004 |
| KR | 10-1998-0067635 | 10/1998 |
| KR | 10-2001-0016746 | 3/2001 |
| KR | 2004-093018 | 3/2004 |
| WO | WO-9218214 A2 | 10/1992 |
| WO | WO-9819972 A1 | 5/1998 |

OTHER PUBLICATIONS

Supplementary European Search Report for Application EP10844989 dated Oct. 18, 2013.
Korean Office Action for Application 20-2012-7000043 dated Jun. 5, 2014.

* cited by examiner

DEVICES FOR AIR-DRYING SLUDGE

TECHNICAL FIELD

This invention generally belongs to the field of sludge treating device. More particularly, it provides a device for air-drying sludge which is capable of drying sewage sludge with low energy consumption.

BACKGROUND ART

Municipal waste water treatment creates sewage sludge in large amounts. Generally, the municipal waste water treatment plant concentrates and dehydrates the sewage sludge to get a dehydrated sludge having a water content of 80% which is transported to other places for further treatments. To facilitate the reduction and reclamation of the dehydrated sludge, it is generally subjected to drying treatment at first.

The commonly used methods for drying sludge include drying in a fluid bed dryer, drying in a multilayer disc drier, film drying, drying in a paddle dryer, and belt drying. The dehydrated sludge is dried directly or indirectly. In the actual drying process, the following problems may occur: (1) the inner parts of the drying device are badly worn, leading to high frequency of the device failure; (2) meddle or high temperature is used for drying, leading to high energy consumption; (3) the treatment of tail gases following the drying is complicated, leading to a high cost; and (4) there is a fair possibility of dust explosions and fires, leading to high dangers.

SUMMARY OF THE INVENTION

An object of the present invention is to overcome the deficiencies of the above mentioned process for drying sludge by providing a device for air-drying sludge which has lower energy consumption, less pollution from tail gases, smaller apparatus investment, more stable operation and higher safety.

This invention embodies as a device for air-drying sludge comprising at least one air-drying mechanism, a dosing mechanism, and a dehumidifying and heating mechanism.

The air-drying mechanism includes an axes, blades and an engine, wherein the output shaft of the engine connects with the axes, wherein the engine drives the axes rotating slowly, wherein the blades are regularly set on the axes according to the advancing direction of the sludge and have the function of overturning, crushing and forwarding of materials, and wherein the dosing mechanism connects with the beginning end of the air-drying mechanism.

There are two air-drying mechanisms, wherein the dosing mechanism connects with the beginning end of the first air-drying mechanism, while the terminal end thereof communicates with the beginning end of the second air-drying mechanism, with a discharge port arranged above the communicating position, and the terminal end of the second air-drying mechanism communicates with the beginning end of the first air-drying mechanism so that a loop configuration is formed.

The dehumidifying and heating mechanism includes a dehumidifying cool exchanger, a tail gas heat exchanger, a dehumidifying heat exchanger, an air warmer, a blower and a refrigeration compressor, wherein an air inlet connects with the dehumidifying cool exchanger, the dehumidifying cool exchanger connects with the tail gas heat exchanger, the tail gas heat exchanger connects with the dehumidifying heat exchanger via the blower, the dehumidifying heat exchanger connects with the air warmer, and there is a condensate discharging pipe at the lower part of the dehumidifying cool exchanger.

The dehumidifying and heating mechanism is set above the air-drying mechanism, wherein the outlet of the air warmer connects with the air inlet of the air-drying mechanism through a pipe, wherein exhaust pipe on the top of the air-drying mechanism connects with the inlet manifold of the tail gas heat exchanger, and wherein the outlet manifold of the tail gas heat exchanger connects with a gas collector which has a condensate collecting pipe on the bottom and a tail gas outlet on the top.

The dosing mechanism includes a sludge storage container and a dosing screw transporter wherein the dosing screw transporter is under the sludge storage container.

Compared to prior art technologies, this invention has following advantages: firstly, the dynamic operation has high stability, allowing an automatic operation. Secondly, the dehumidifying and heating mechanism includes energy recovery devices, making the drying process high efficiency but low energy consumption. Thirdly, the detention time of the sludge in the air-drying device is adjustable, making the water content of the resulting materials adjustable. Fourthly, tail gases are condensed to discharge the condensate before emitting, reducing the cost for further treating the tail gases. Fifthly, the resulting sludge is in the form of loose particles, leading to no anaerobic odor during the long time storage and making them easier for reclamation.

DESCRIPTION OF PREFERRED EMBODIMENTS

Figure 1:
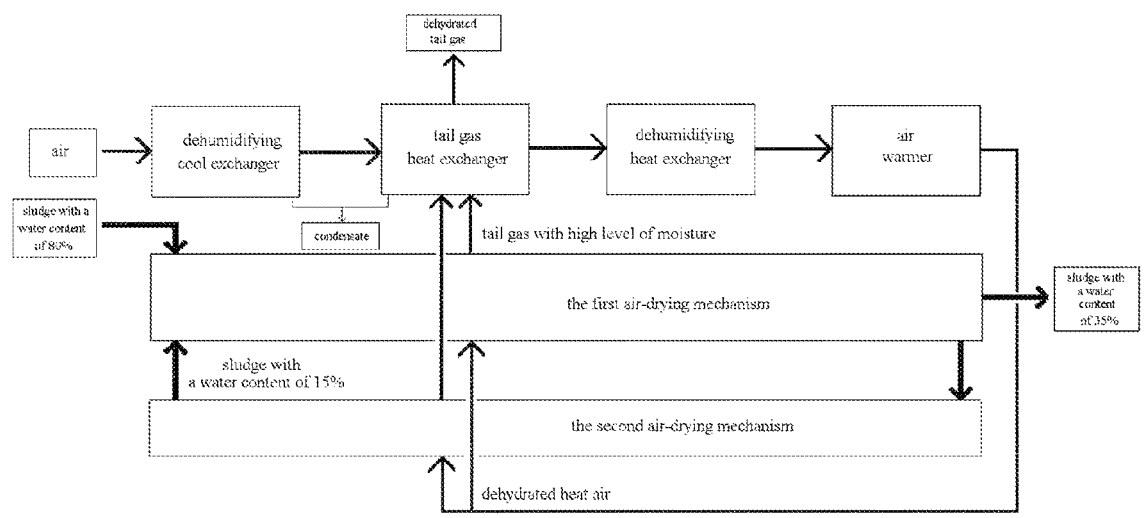
FIG. 1 is a schematic flowchart illustrating a device for air-drying sludge in accordance with this invention.

This invention is described in the following section of this specification by making reference to the drawing figures and the embodiments.

Figure 2:
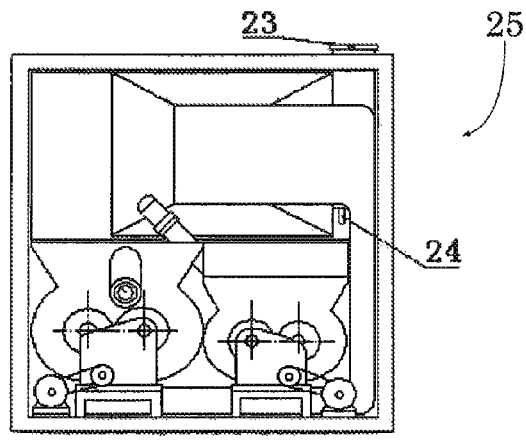
FIG. 2 is a right side view of the structure of a device for air-drying sludge in accordance with this invention.
Figure 3:
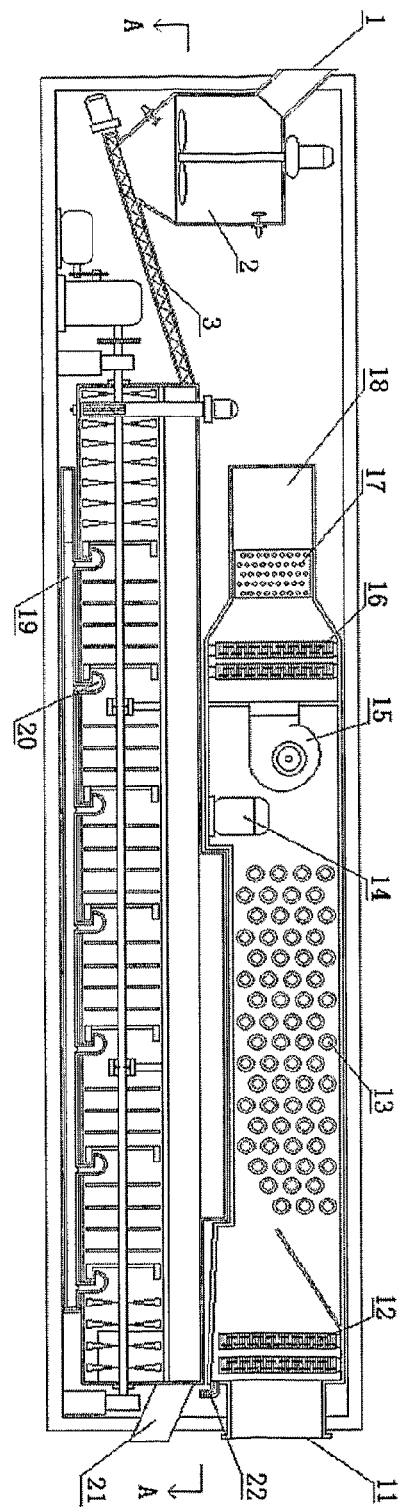
FIG. 3 is a front view of the structure of a device for air-drying sludge in accordance with this invention.
Figure 4:
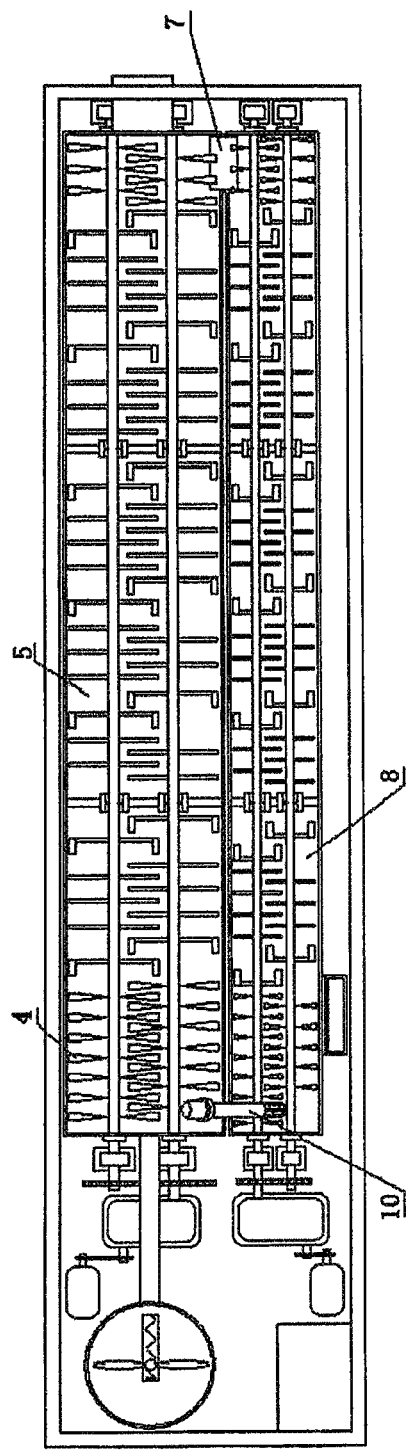
FIG. 4 is an illustration of the structure of the cross section at A-A of a device for air-drying sludge in accordance with this invention.

As showed in FIGS. 1-4, a device for air-drying sludge includes at least one air-drying mechanism, a dosing mechanism and a dehumidifying and heating mechanism. The air-drying mechanism includes a housing, an axes, blades 4 and an engine, wherein the output shaft of the engine connects with the axes, wherein the engine drives the axes rotating slowly, wherein the blades 4 are regularly set on the axes along the advancing direction of the sludge and have the function of overturning, crushing and forwarding the materials, wherein the dosing mechanism connects with the beginning end of the air-drying mechanism. There are two the air-drying mechanisms, wherein the dosing mechanism connects with the beginning end of the first air-drying mechanism 5, while the terminal end thereof communicates with the beginning end of the second air-drying mechanism 8 through a communicating channel 7, with a discharge port 21 arranged above the communicating channel 7, and the terminal end of the second air-drying mechanism 8 communicates with the beginning end of the first air-drying mechanism 5 so that a loop configuration is formed.

The dosing mechanism includes or consists of a sludge storage container 2 and a dosing screw transporter 3 wherein the dosing screw transporter 3 is under the sludge storage container 2. The sludge is fed into the sludge storage container 2 via the inlet 1, and is transported via the dosing screw transporter 3 to the beginning end of the first air-drying mechanism 5. The dosing amount of the sludge is determined by the rotate speed of the dosing screw transporter 3. A dried sludge with a water content of 5-35% is transported within the device for air-drying sludge via a dosing screw transporter 10. The dosing amount of the dried sludge is determined by the rotate speed of the dosing screw transporter 10.

The dehumidifying and heating mechanism includes a dehumidifying cool exchanger 12, a tail gas heat exchanger 13, a dehumidifying heat exchanger 16, an air warmer 17, a blower 15 and a refrigeration compressor 14, wherein an air inlet 11 connects with the dehumidifying cool exchanger 12, the dehumidifying cool exchanger 12 connects with the tail gas heat exchanger 13, the tail gas heat exchanger 13 connects with the dehumidifying heat exchanger 16 via the blower 15, the air warmer 17 is above the dehumidifying heat exchanger 16, and there is a condensate discharging pipe 22 at the bottom of the dehumidifying cool exchanger 12. The dehumidifying and heating mechanism is above the first air-drying mechanism 5 wherein the outlet of the air warmer connects through a pipe 19 with the air inlet 20 on the side or bottom of the air-drying mechanism, the exhaust pipe on the top of the air-drying mechanism connects with the inlet manifold of the tail gas heat exchanger, and the outlet manifold of the tail gas heat exchanger connects with a gas collector 25 which has a condensate collecting pipe 24 on the bottom and a tail gas outlet 23 on the top.

The dehydrated sludge with a water content of 40-85% was fed into the sludge storage container 2 via the inlet 1, and was transported via the dosing screw transporter 3 to the beginning end of the first air-drying mechanism 5. The dosing amount of the sludge was determined by the rotate speed of the dosing screw transporter 3. A dried sludge with a water content of 5-35% was transported within the device for air-drying sludge via a dosing screw transporter 10. The dosing amount of the dried sludge was determined by the rotate speed of the dosing screw transporter 10. The wet sludge and the dried sludge was combined, overturned and forwarded at the action of the blades 4. The rotate speed of the axis of the first air-drying mechanism 5 was adjustable between 0-30 rpm. Via the heat conducting and mass transferring with the dehumidified and heated air from the air inlet 20, the moisture in the sludge was evaporated. When forwarded to the terminal end of the first air-drying mechanism 5, the sludge had a reduced water content of 20-40% and an appearance of loose particles. Upon the pressure, the sludge at the terminal end of the first air-drying mechanism 5 entered into the beginning end of the second air-drying mechanism 8 through a communicating channel 7. The rotate speed of the axis of the second air-drying mechanism was adjustable between 0-30 rpm. When the level of the materials in the second air-drying mechanism 8 was over the lower side of the discharge port 21, the sludge was discharged from the discharge port 21 as sludge product. The sludge entering the second air-drying mechanism 8 was overturned and forwarded at the action of the blades 4. At the same time, the sludge was subjected to the heat conducting and mass transferring with the dehumidified and heated air from the bottom of the second air-drying mechanism 8. The moisture in the sludge was further evaporated. When at the terminal end of the second air-drying mechanism, the sludge had a reduced water content of 5-35%, which was transported via the dosing screw transporter 10 to the beginning end of the first air-drying mechanism 5 and combined with the fresh dehydrated sludge with a water content of 40-85% which was fed into the beginning end of the first air-drying mechanism 5. Then the above procedures were circulated.

Upon the action of the blower 15, air were sucked into the dehumidifying and heating mechanism and cooled in the dehumidifying cool exchanger 12, with the condensate was discharged from the condensate discharging pipe 22. By passing the dehumidified air through the outer space of the tail gas heat exchanger 13 and the tail gas through the inner tubes of the tail gas heat exchanger 13, the air and the tail gas were indirectly heat-exchanged to recover the heat of the tail gas. Then, the air was passed into the dehumidifying heat exchanger 16 to recover the heat. Next, the air was passed into the air warmer 17 to increase the temperature thereof to 20-200° C. Finally, the air was distributed through a main manifold 18 into the communicating pipe 19 and blown into the first and second air-drying mechanism. The dehumidified and heated air was subjected to the heat conducting and mass transferring with the sludge, which makes the moisture in the sludge evaporated. The tail gas was collected by a gas collecting port over the air-drying mechanism and cooled in the tail gas heat exchanger 13, with the condensate was discharged from a condensate of the tail gas discharging pipe 24 and the cooled tail gas was emitted from a tail gas emitting pipe 23.

It should be emphasized that the above-described embodiments is not to be considered as limiting. Many variations and modifications may be made by those skilled persons in the art to the above-described embodiments of the invention without departing substantially from the spirit and principles of the invention. All such modifications and variations are intended to be included herein within the scope of this disclosure and the present invention and protected by the following claims.

The invention claimed is:

1. A device for air-drying sludge, comprising:
at least one air-drying mechanism,
a dosing mechanism, and
a dehumidifying and heating mechanism, wherein the air-drying mechanism includes an axis blades and an engine, wherein the output shaft of the engine connects with the axis, wherein the blades are set on the axis, wherein the dosing mechanism connects with the beginning end of the air-drying mechanism, wherein the dehumidifying and heating mechanism includes a dehumidifying cool exchanger, a tail gas heat exchanger, a dehumidifying heat exchanger, an air warmer, a blower and a refrigeration compressor, wherein an air inlet connects with the dehumidifying cool exchanger, wherein the dehumidifying cool exchanger connects with the tail gas heat exchanger, wherein the tail gas heat exchanger connects with the dehumidifying heat exchanger via the blower, wherein the dehumidifying heat exchanger connects with the air warmer, and there is a condensate discharging pipe at the lower part of the dehumidifying cool exchanger, wherein the dehumidifying and heating mechanism is above the air-drying mechanism, wherein the outlet of the air warmer connects with the air inlet of the air-drying mechanism through a pipe, wherein an exhaust pipe on the top of the air-drying mechanism connects with an inlet manifold of the tail gas heat exchanger, and wherein an outlet manifold of the tail gas heat exchanger connects with a gas collector which has a condensate collecting pipe on the bottom and a tail gas outlet on the top.

2. The device of claim 1, wherein the rotate speed of the axis of the air-drying mechanism is between 0-30 rpm.

3. The device of claim 1, wherein the dosing mechanism includes a sludge storage container and a dosing screw transporter wherein the dosing screw transporter is under the sludge storage container.

4. The device of claim 3, wherein the rotate speed of the axis of the air-drying mechanism is between 0-30 rpm.

5. The device of claim 1, wherein there are two air-drying mechanisms, wherein the dosing mechanism connects with the beginning end of the first air-drying mechanism, while the terminal end thereof communicates with the beginning end of the second air-drying mechanism, with a discharge port arranged above the communicating position, and the terminal end of the second air-drying mechanism communicates with the beginning end of the first air-drying mechanism so that a loop configuration is formed.

6. The device of claim 5 wherein the rotate speed of the axis of the air-drying mechanism is between 0-30 rpm.

\* \* \* \* \*